H. A. MASON.
ICE CREAM CUTTER.
APPLICATION FILED JULY 25, 1916.

1,231,279.

Patented June 26, 1917.
2 SHEETS—SHEET 1.

WITNESSES
Chas. N. Leibman
E. B. Marshall

INVENTOR
Hosea A. Mason
BY
ATTORNEYS

H. A. MASON.
ICE CREAM CUTTER.
APPLICATION FILED JULY 25, 1916.
1,231,279.
Patented June 26, 1917.
2 SHEETS—SHEET 2.
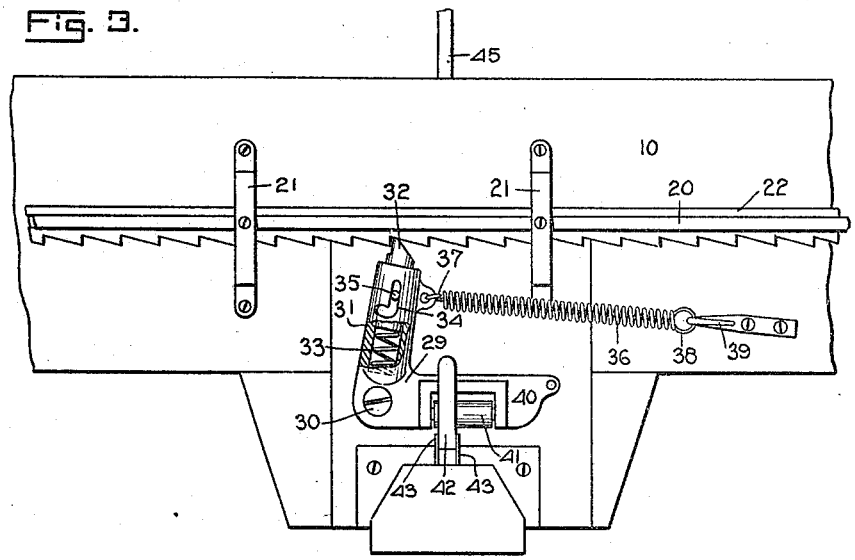
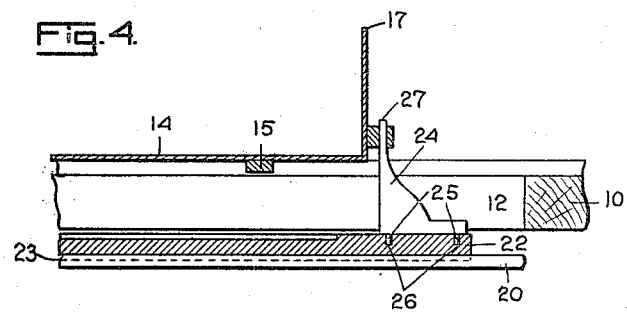
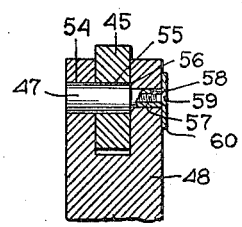
WITNESSES
INVENTOR
Hosea A. Mason
BY
ATTORNEYS

UNITED STATES PATENT OFFICE.

HOSEA ALFRED MASON, OF TAUNTON, MASSACHUSETTS, ASSIGNOR OF ONE-HALF TO WILLIAM E. QUIGLEY, OF TAUNTON, MASSACHUSETTS.

ICE-CREAM CUTTER.

1,231,279.  
Specification of Letters Patent.  
Patented June 26, 1917.

Application filed July 25, 1916. Serial No. 111,167.

*To all whom it may concern:*

Be it known that I, HOSEA A. MASON, a citizen of the United States, and a resident of Taunton, in the county of Bristol, and State of Massachusetts, have invented a new and useful Improvement in Ice-Cream Cutters, of which the following is a full, clear, and exact description.

My invention has for its object to provide improvements in ice cream cutters which may be operated quickly, the device being constructed with relatively few and simple parts, thereby permitting the operator to quickly and thoroughly cleanse the device.

Additional objects of the invention will appear in the following specification, in which the preferred form of the invention is disclosed.

In the drawings similar reference characters denote similar parts in all the views, in which—

Fig. 3 is an inverted plan view illustrating the means for operating the rack;

Fig. 4 is a fragmentary sectional view of the table; and

Fig. 5 is an enlarged fragmentary sectional view illustrating the manner in which the operating arm is pivoted.

Figure 1:
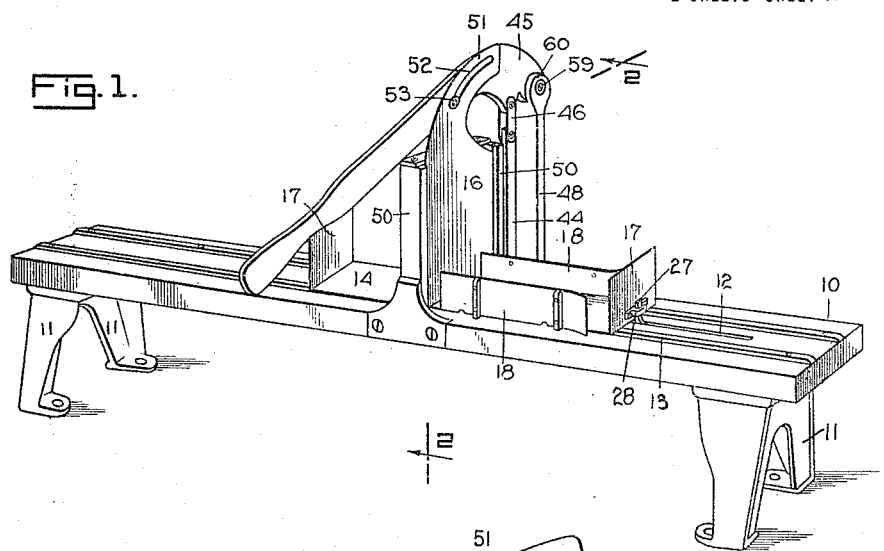
Figure 1 is a perspective view illustrating my invention.
Figure 2:
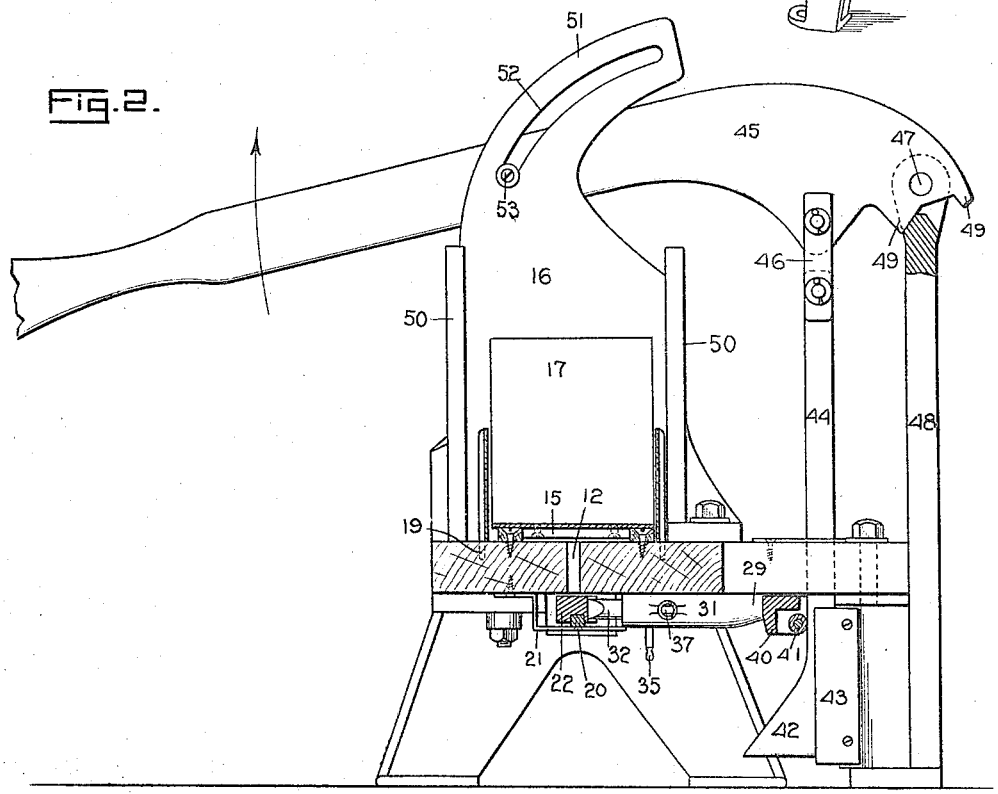
Fig. 2 is a central view on the line 2—2 of Fig. 1.

By referring to the drawings, it will be seen that a table 10 is provided, which may be supported by legs 11, there being a longitudinal slot 12 through the top of the table. There are two guide rails 13 secured to the top of the table, one at each side of the slot 12. A tray 14 is disposed for traveling on the guide rails 13, the lateral movement of this tray relatively to the guide rails 13 being prevented by two depending guide members 15 on the tray 14, these members 15 being best shown in Figs. 2 and 4 of the drawings. It will be understood that the tray 14 having an ice cream brick thereon may be disposed for moving on the guide rails 13, so that the brick may be cut with a cutter 16, and that after the ice cream brick on the tray 14 has been cut, the tray 14 may be readily removed from the guide rails 13, and another tray of similar construction and having an ice cream brick disposed thereon may be placed on the guide rails 13, each of the trays 14 being preferably provided with end walls 17 by which means the ice cream brick is held in position on the tray. As a means of preventing the lateral displacement of the ice cream brick which is disposed on the tray 14 as the brick moves under the cutter 16, I provide side walls 18 which have pins disposed in orifices in the table 10, these pins being indicated at 19 in Fig. 2 of the drawings. It will be understood that these side walls 18 may be readily removed in order that the device may be thoroughly washed and cleansed.

Disposed under the table 10, there is a rail 20 which is supported by brackets 21, the said rail 20 being spaced from the bottom of the table 10 and being disposed under the slot 12. This rail 20 is provided for supporting a rack bar 22 which has a groove 23 in its bottom in which the upper portion of the rail 20 is disposed. By this means the movement of the rack bar 22 is directed when the rack bar is operated by a means which will shortly be described. I propose to make use of different rack bars, with teeth spaced different distances apart, so that while one rack bar may be used to cut a brick of ice cream into six pieces, another rack bar may be substituted should it be desired to cut the ice cream brick into eight pieces. The rack bar slides easily on the rail 20, so that it may be removed after the tooth of the operating lever has been disengaged from the rack bar tooth.

The rack bar moves the tray 14 on the guide rails 13 by means of a follower 24 which is provided with pins 25, which are disposed in orifices 26 in the rack bar 22. This follower 24 extends upwardly through the slot 12, and has an upwardly extending pin 27 which is normally embraced by a bracket 28. It is possible, however, to readily disengage the bracket 28 from the pin 27, so that the tray 14 may be removed and another tray substituted. It is also possible to raise the follower 24 relatively to the rack bar 22, thereby disengaging the pins 25 from the rack bar 22 at the orifices 26, so that the follower 24 will not interfere with the substitution of another rack bar for cutting the ice cream into a greater or less number of pieces. It will also be seen that when the follower 24 and the rack bar 22 are removed from the table 10, the table 10 and the rail 20 may be thoroughly and quickly cleansed.

Underneath the table 10, a lever 29 is fulcrumed at 30, the arm 31 of this lever 29 having an opening in which a tooth 32 is disposed, this tooth 32 being held yieldingly extended by means of a spring 33. There is a bayonet slot 34 in the side of the arm 31 of the lever and there is a pin 35 on the tooth 32 so that by pressing the pin 35 rearwardly and laterally, the tooth 32 may be held out of engagement with the rack bar 22, and the rack bar 22 may be moved freely, without reference to the position of the lever 29. The lever 29 is held normally with its tooth 32 in the position illustrated in Fig. 3 of the drawings by means of a spring 36, one end 37 of which is secured to the outer end of the arm 31, the other end 38 of the spring 36 having a ring which extends rearwardly and is secured to a hook 39 fastened to the table. To the other arm 40 of the lever 29 there is journaled a roller 41 which is disposed for engagement by a cam 42, the movement of this cam 42 being regulated by a vertical guideway 43. An arm 44 which extends upwardly from the cam 42 is connected with the operating arm 45 by means of links 46. This operating arm 45 is pivoted at 47 to a standard 48. The arm 45 has stops 49 disposed for engaging the standard 48 below the pivot 47 to limit the movement of the arm 45 in each direction. The ice cream brick on the tray 14 is cut by the cutter 16, as has been stated, this cutter 16 moving in vertical guideways 50 and having an arm 51 with a slot 52 in which a pin 53 on the arm 45 is movably disposed.

As will be seen by referring to Fig. 5 of the drawings, the pivot pin 47 for the arm 45 is disposed through a bearing 54 in the standard 48, and then in a bearing 55 in the arm 45, the pivot pin 47 having a shoulder 56 which abuts against the standard 48 at the side of the arm 45. The end 57 of the pin 47 is of reduced diameter and has a threaded orifice 58 in which a screw 59 meshes, the screw 59 passing through an opening in a washer 60 before meshing in the threaded orifice 58. This means of pivoting the arm 45 is such that the arm at its pivot may be readily and thoroughly cleansed.

As has been stated, the ice cream bricks may be cut very readily as the trays are placed on the guide rails and are subsequently removed, it being possible, however, to place a tray with an uncut brick on the guide rails 13 and with the bracket 28 embracing the pin 27 so that when the tooth 32 is removed from the rack bar teeth, the tray 14 may be pushed to primary position, carrying with it the rack bar, after which the pin 35 may be freed from the lateral portion of the bayonet slot 34 so that the tooth 32 will engage the rack bar teeth, and the device will be ready for operation.

Having thus described my invention, I claim as new and desire to secure by Letters-Patent:

1. In an ice cream cutter, a table having a slot and two guide rails, a tray movably disposed on the rails, a transverse member depending from the tray and disposed between the rails, a bar disposed under the table, a cutter, means to operate the bar and the cutter, the table having a slot leading to the cutter, a bracket on the tray, and a follower normally disposed in the slot and detachably secured to the bar and the bracket.

2. In an ice cream cutter, a table having a slot, a rail disposed below the table at the slot and spaced therefrom, means secured to the table for supporting the rail, a rack bar disposed on the rail, the rack bar having a longitudinal groove in which the rail extends, a cutter disposed above the table, a tray movable on the table, a bracket on the tray, a follower normally disposed in the slot and detachably secured to the bar and the bracket, and means having a tooth for operating the rack bar.

HOSEA ALFRED MASON.

Witnesses:
HENRY F. CARNEY,
JAMES J. O'CONNOR.

Copies of this patent may be obtained for five cents each, by addressing the "Commissioner of Patents, Washington, D. C."